(12) United States Patent
Palka et al.

(10) Patent No.: US 6,741,171 B2
(45) Date of Patent: May 25, 2004

(54) SYSTEM FOR TRANSMITTING AND VERIFYING ALARM SIGNALS

(75) Inventors: Mark Stephan Palka, Edmonton (CA); Gary Arthur Hamilton, Edmonton (CA); Michael Kevin Tulley, Edmonton (CA); Giuseppe Colucciello, Miami, FL (US)

(73) Assignee: Phasys Limited, Edmonton (CA)

( * ) Notice: Subject to any disclaimer, the term of this patent is extended or adjusted under 35 U.S.C. 154(b) by 449 days.

(21) Appl. No.: 09/774,804

(22) Filed: Feb. 1, 2001

(65) Prior Publication Data

US 2002/0073333 A1 Jun. 13, 2002

(30) Foreign Application Priority Data

Dec. 7, 2000 (CA) .............................................. 2327847

(51) Int. Cl.[7] ........................ G08B 23/00; G06F 15/173
(52) U.S. Cl. ...................... 340/501; 340/531; 340/506; 713/201; 709/224
(58) Field of Search ................................ 340/501, 506, 340/539, 540, 531; 700/17, 83; 713/200, 201; 709/224

(56) References Cited

U.S. PATENT DOCUMENTS

| | | | | |
|---|---|---|---|---|
| 5,517,547 A | | 5/1996 | Ladha et al. .................. 379/40 |
| 5,621,889 A | * | 4/1997 | Lermuzeaux et al. ....... 713/201 |
| 5,777,549 A | * | 7/1998 | Arrowsmith et al. ........ 340/506 |
| 5,982,418 A | | 11/1999 | Ely ............................ 348/153 |
| 5,991,881 A | * | 11/1999 | Conklin et al. ............. 713/201 |
| 6,032,037 A | | 2/2000 | Jeffers ........................ 455/404 |
| 6,281,790 B1 | | 8/2001 | Kimmel et al. ............. 340/506 |

* cited by examiner

Primary Examiner—Donnie L. Crosland

(57) ABSTRACT

A system for transmitting and verifying alarm signals over a TCP/IP network includes an alarm panel hosting an alarm client and verification server and connected to at least one alarm sensor, a TCP/IP network, an alarm monitor server and a verification station connected to each other and to the TCP/IP network. If the alarm client detects an alarm situation, it transmits an alarm signal to the alarm monitor server. The alarm signal contains information on how to contact the verification server. If it is necessary to verify the alarm signal, the alarm monitor station sends the alarm verification station a verification request containing the contact information for the verification server. The alarm verification station contacts the verification server and obtains the verification information available from the alarm verification server.

14 Claims, 10 Drawing Sheets

SYSTEM FOR TRANSMITTING AND VERIFYING ALARM SIGNALS

FIELD OF THE INVENTION

This invention relates to alarms and remote alarm monitoring systems and more particularly to methods and apparatus for transmitting and verifying alarm signals over a TCP/IP network.

BACKGROUND OF THE INVENTION

Commercial and residential alarm systems which are remotely monitored are well known. In simplest terms, these systems comprise some form of sensor which produces a signal when the sensor is tripped, a means for transmitting the signal and an alarm monitoring station.

The alarm sensors can take many different forms, including fire, smoke, heat, motion, noise, power failure, intrusion and light detectors. Typically, these sensors have only two states, on and off, one of which indicates an alarm situation. That is, with some alarm sensors a circuit is closed and a signal is sent when the relevant alarm situation arises. With other alarm sensors a circuit is opened and a signal stops being sent when the relevant alarm situation arises. Typically, the alarm sensors are connected to some device which interprets the absence or presence (as the case may be) of a signal from the alarm sensor as an alarm situation and produces an alarm signal. With remotely monitored alarm systems, the alarm signal is then transmitted to the alarm monitoring station. As well, the alarm signal may be indicated at the location of the alarm sensor by various means, including bells, horns and flashing lights.

The known means for transmitting the alarm signal include wireless (for example, cellular telephone), telephone lines, and Transmission Control Protocol/Internet Protocol (referred to as TCP/IP) networks.

A network is a collection of computing devices connected together so that some of the software programs resident on those computing devices can exchange information. Such networks may include conventional telephone lines, high-speed data lines, and wireless and cellular telephone connections. An essential element for the proper functioning of any network is a set of rules for the exchange of information between the software programs. Such rules are referred to as data communication protocols. TCP/IP is a widely used set of data communication protocols. Networks which use TCP/IP to communicate are referred to as TCP/IP networks. The Internet is a global TCP/IP network.

The computing device on which a particular software program resides is said to be hosting that software and is referred to as the host computer or host. For the purpose of conceptualizing the exchange of information over a network, it is useful to think of the software programs as distinct entities and to characterize them as either clients or servers. Servers are software programs, which reside on computing devices connected to networks and which listen for incoming communication and permit communication to be initiated by other software programs, but do not initiate communication. Clients are software programs, which reside on computing devices connected to networks and which initiate communication with other software programs. A host computer can host more than one program.

The TCP/IP protocols provide several important characteristics which facilitate world-wide communication on the Internet, including a common addressing scheme which allows any device running TCP/IP to uniquely address any other device on the Internet. The backbone of the Internet consists of a series of high-speed communication links between major supercomputer sites, and educational and research institutions throughout the world. Connected to this backbone are thousands of World-Wide Web servers and millions of host computers. The Internet is a very robust communication means because, usually, many alternate routes are available between any two sites connected to the Internet.

The basis of Internet data transmission is an underlying, connectionless packet delivery system. The basic unit of data transfer is the packet, a block of data with a strict upper limit on block size that carries with it sufficient identification necessary for delivery to its destination. Data is transmitted through the Internet by dividing it into packets and sending one packet at a time. Each packet contains the sender's IP address and the destination IP address.

The networking of computing devices raises security concerns about the software programs and data used by, and stored on, those computing devices connected to the network, particularly the Internet. So-called hackers are persons who attempt to use the Internet to gain access to data in the private computer systems of individuals, businesses and governments. A hacker who desires to break into a computer system will use an external computing device to attempt to initiate communication with that computer system through the Internet. The fact of communication initiation is very significant in network security, as the party which initiates communication can usually define the scope of the communication. For example, if an external computing device is able to successfully initiate communication with a computer system, this essentially creates a doorway through which the external computing device may make other connections within the computing system.

A common response to the concerns about network security caused by hackers is to install so-called firewalls. Firewalls are software programs which implement a set of rules to restrict the flow of packets between the network, which they protect, and the Internet. Among other things, firewalls typically prevent server programs protected by the firewall from accepting client connections from outside the firewall.

Each host computer connected to a TCP/IP network has an IP address, a unique digital address which can be used to send messages to that host. However, the number of hosts which routinely connect to the Internet now outnumber the IP addresses available under the current IP address system. There are two methods currently in use to deal with this address shortage. The two systems are referred to as the Dynamic IP address and Proxy servers.

Dynamic IP Address:

Fortunately, not all hosts are connected to the Internet at the same time and not all hosts need permanent IP addresses. For example, host computers hosting servers must have permanent IP addresses because the servers are listening for hosts wishing to connect to them and otherwise they could not be found on the Internet. On the other hand, computing devices hosting clients need not have permanent IP addresses, and often don't. A host without a permanent IP address can obtain a temporary, or dynamic, IP address each time it wishes to initiate communication over the Internet. Typically, the dynamic IP address is provided by the relevant Internet service provider. As with permanent IP addresses, the relevant host's dynamic IP address is added to every packet sent by that host to enable the recipients to reply.

Proxy Servers:

A single IP address on the Internet may be shared by a number of hosts on a Local Area Network (LAN) through a proxy server. Each host on the LAN is given an IP address which is locally valid, but not unique, globally valid IP address. When a client program running on a host on the LAN wants to communicate with a server on the Internet, it actually makes the connection request to the proxy server, which puts its own IP address on the packet and passes the request along to the intended server. That server replies to the proxy server, which passes the reply along to the host on the LAN which originated the connection.

Fortunately, not all hosts are connected to the Internet at the same time and not all hosts need permanent IP addresses. For example, host computers hosting servers must have permanent IP addresses because the servers are listening for hosts wishing to connect to them and otherwise they could not be found on the Internet. On the other hand, computing devices hosting clients need not have permanent IP addresses, and often don't. A host without a permanent IP address can obtain a temporary, or dynamic, IP address each time it wishes to initiate communication over the Internet. Typically, the dynamic IP address is provided by the relevant Internet service provider. As with permanent IP addresses, the relevant host's dynamic IP address is added to every packet sent by that host to enable the recipients to reply.

The reliability, flexibility and inexpensiveness of Internet communication has rapidly made it the preferred communication means for a variety of applications. These factors make the Internet is a good channel for the transmission of alarm signals, particularly over large distances, such as are used in remotely monitored alarm systems.

Another feature which is desirable in remotely monitored alarm systems is the ability to verify that an alarm situation has actually occurred after an alarm signal has been received. False alarm signals are not uncommon. They can be caused in a variety of ways, including faulty alarm sensors and user error, such as failing to deactivate an alarm system within a certain time after entering a building. Means for verifying that an alarm situation actually exists at a building from which an alarm signal has been received are known. They include traditional means such as sending personnel to visit the premises from which the alarm signal originated. There are also means which could be controlled over at TCP/IP network, such as, video observation, audio listening, audio challenge and response, and remote control of lights and other devices such as robotics.

Communication over the Internet for the purpose of verifying alarms raises issues of network security for the user of the alarm system. Sending an alarm signal over a TCP/IP network causes few concerns because the software program which initiates the communication, and therefore defines the scope of the exchange, is part of the alarm system. It is a client rather than a server. However, it is crucial for building security that the software program (or programs) controlling the verification means, for example video cameras installed within a building, be protected from access and tampering by hackers. Clearly, an alarm system would be unacceptable if it enabled hackers to obtain video images or audio signals from within the relevant building. Most firewalls would not be capable of distinguishing between a hacker attempting to hack in to an alarm verification software program and an authorized user attempting to initiate communication in order to verify an alarm. As well, it is often desirable with remote alarm monitoring systems to separate the alarm signal monitoring function from the alarm verification function. In some cases it may be desirable to have the alarm verification function hosted on a separate workstation on the same local area network as the alarm monitor function. In other cases it may be desirable to have the alarm verification function hosted at a physical location remote from the alarm monitor function. For example, when an alarm indicates that there are intruders in a building and the verification means is video images, it would be useful for security personnel to have a wireless portable device which is able to receive video images from the building over the Internet.

Remote alarm monitoring systems comprising connections to the Internet and means for obtaining and sending video images are known. However, those that send both the alarm message and verification over the Internet do so by combining them into one data stream on a single connection. This requires that the alarm monitoring station and the alarm verification station be combined on the same host. They do not permit the alarm verification function to be separated from the alarm monitoring function. Other systems are known in which the alarm system and a video server are separately connected to the Internet. These systems typically do not work well with firewalls or proxy servers, which are not intended to allow outside clients to connect to an inside server.

What is needed is a remote alarm monitoring system capable of communicating over a TCP/IP network, capable of communicating through a firewall without jeopardizing the security of the computer system protected by the firewall, and capable of separating the alarm monitoring and alarm verification functions

BRIEF SUMMARY OF THE INVENTION

The invention seeks to provide an improved alarm signal and alarm verification system overcoming many of these problems. The invention enables the sending of alarm signals and alarm verification over the TCP/IP Network. The alarm signal includes the information which the alarm monitor and alarm verification station will require to make a connection to the alarm panel for alarm verification over the TCP/IP network. The alarm panel integrates means of sending and receiving alarm signals and alarm verification over the TCP/IP network. The alarm verification station can obtain information from the verification server over the TCP/IP network through firewalls.

In accordance with one aspect of the invention, there is provided a system and method of an alarm system for sending an alarm signal from an alarm panel host to a central monitoring host for, receiving an alarm signal, gathering information and composing a verification request, sending a verification request, receiving a verification request at the source, gathering and composing a verification data response, sending a verification data response, receiving a verification data response, and responding to the verification data response, and to determine the validity of an alarm situation over a TCP/IP network.

In accordance with another aspect of the invention, there is provided a system and method of an alarm system for sending an alarm signal from an alarm panel host to a central monitoring host for, receiving an alarm signal, gathering information and composing a verification request, sending a verification request to a verification host, connecting to a verification server, receiving a verification request at the source of the alarm, gathering and composing a verification data response, sending a verification data response, receiving a verification data response, and responding to the verification data response, and to determine the validity of an alarm situation over a TCP/IP network.

In accordance with another aspect of the invention, there is provided a system and method of an alarm system for sending an alarm signal from an alarm panel host to a central monitoring host, receiving an alarm signal, gathering information and composing a verification request, sending a verification request to a verification host, connecting to an intermediate server host, connecting to a verification server, receiving a verification request at the source of the alarm, gathering and composing a verification data response, sending a verification data response to an intermediate server host, sending a verification data response to a verification host, receiving a verification data response, and responding to the verification data response, to determine the validity of an alarm situation over a TCP/IP network.

In accordance with another aspect of the invention it should be noted that any combination of the host may be used. That is to say, each component, the alarm client, the verification server, the alarm monitor server, the alarm database, the verification station, and the intermediated server could all be hosted on different hosts.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

Figure 9:
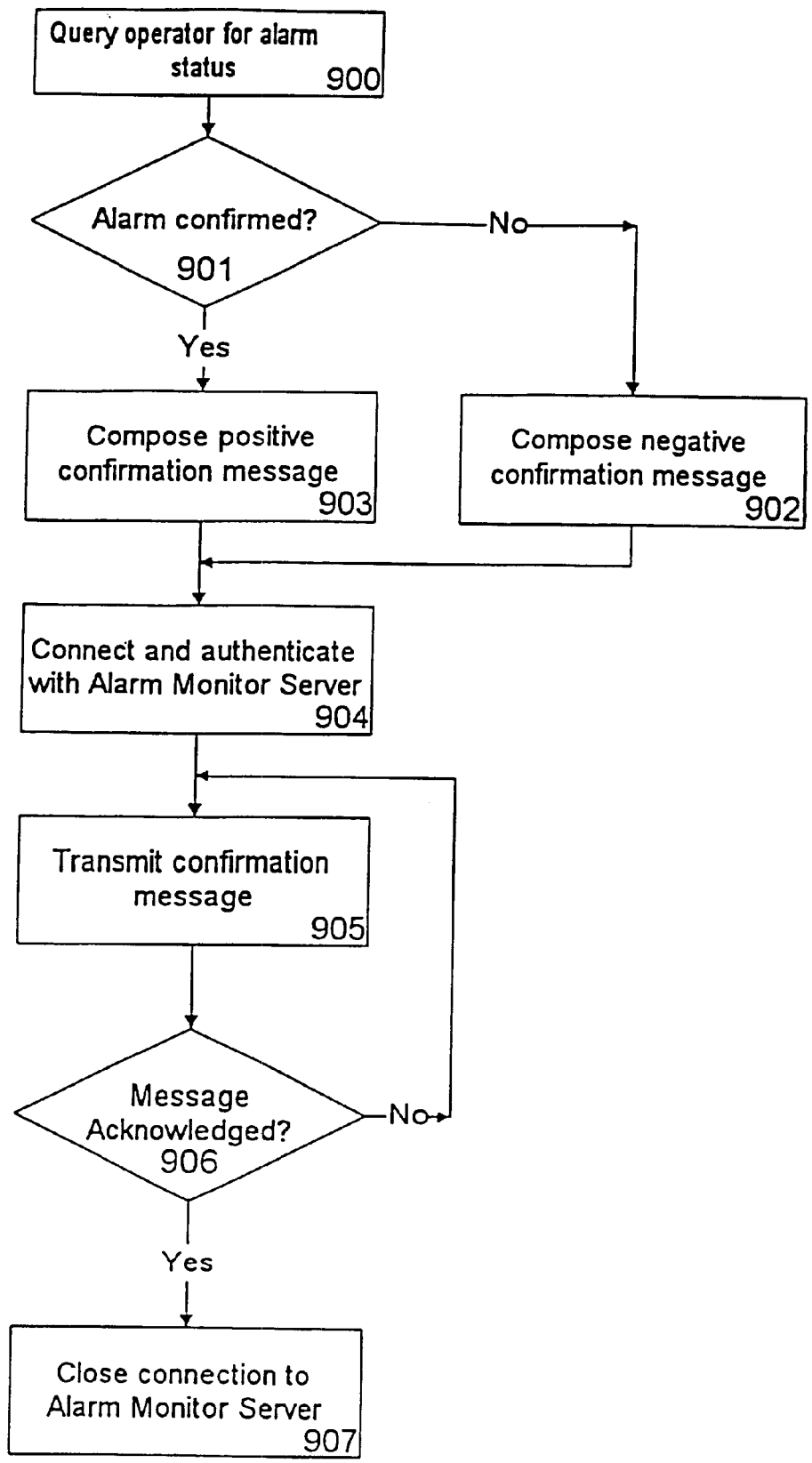
Figure 10:
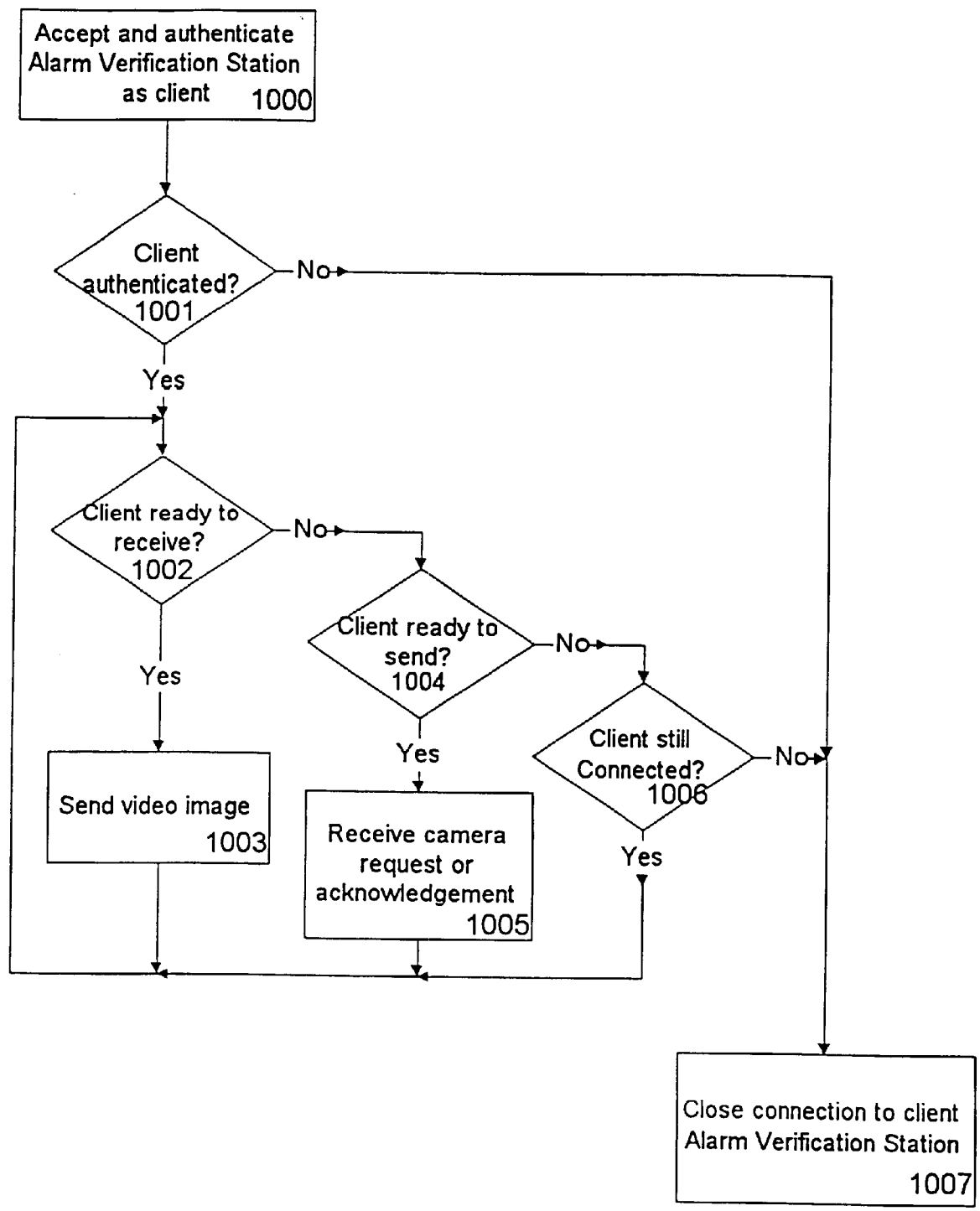

FIG. 9 is a step by step flowchart of the preferred method of the operation of the alarm system, upon detection of an alarm situation, from the perspective of the alarm verification station detailing the composition and sending of a verification message to the alarm monitor server; and, FIG. 10 is a step by step flowchart of the preferred method of the operation of the alarm system, upon detection of an alarm situation, from the perspective of the alarm verification server.

DESCRIPTION OF A SPECIFIC EMBODIMENT

Figure 1:
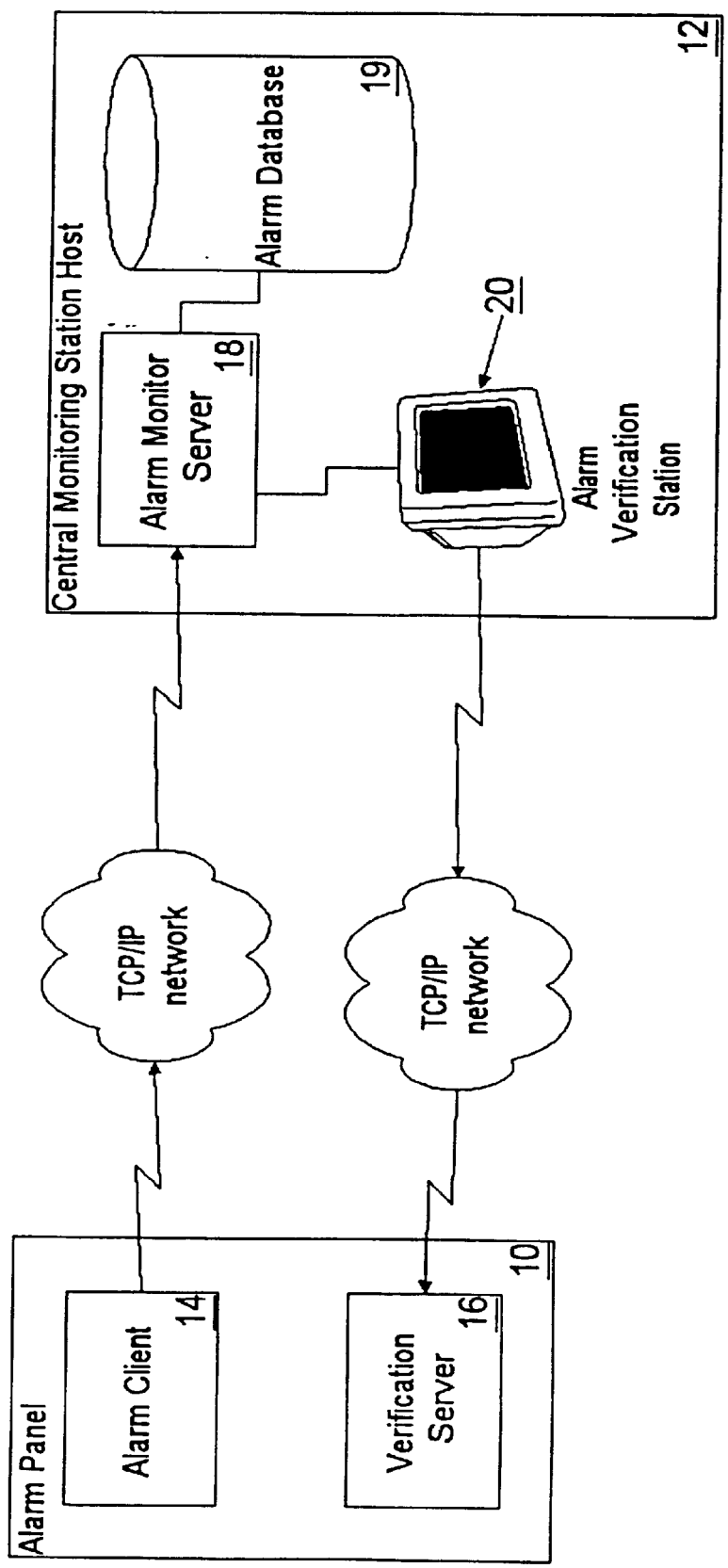
FIG. 1 is a schematic diagram showing one preferred configuration between an alarm panel host, and a central monitoring station, the central monitoring station consisting of one host and devoid of firewalls.
Figure 2:
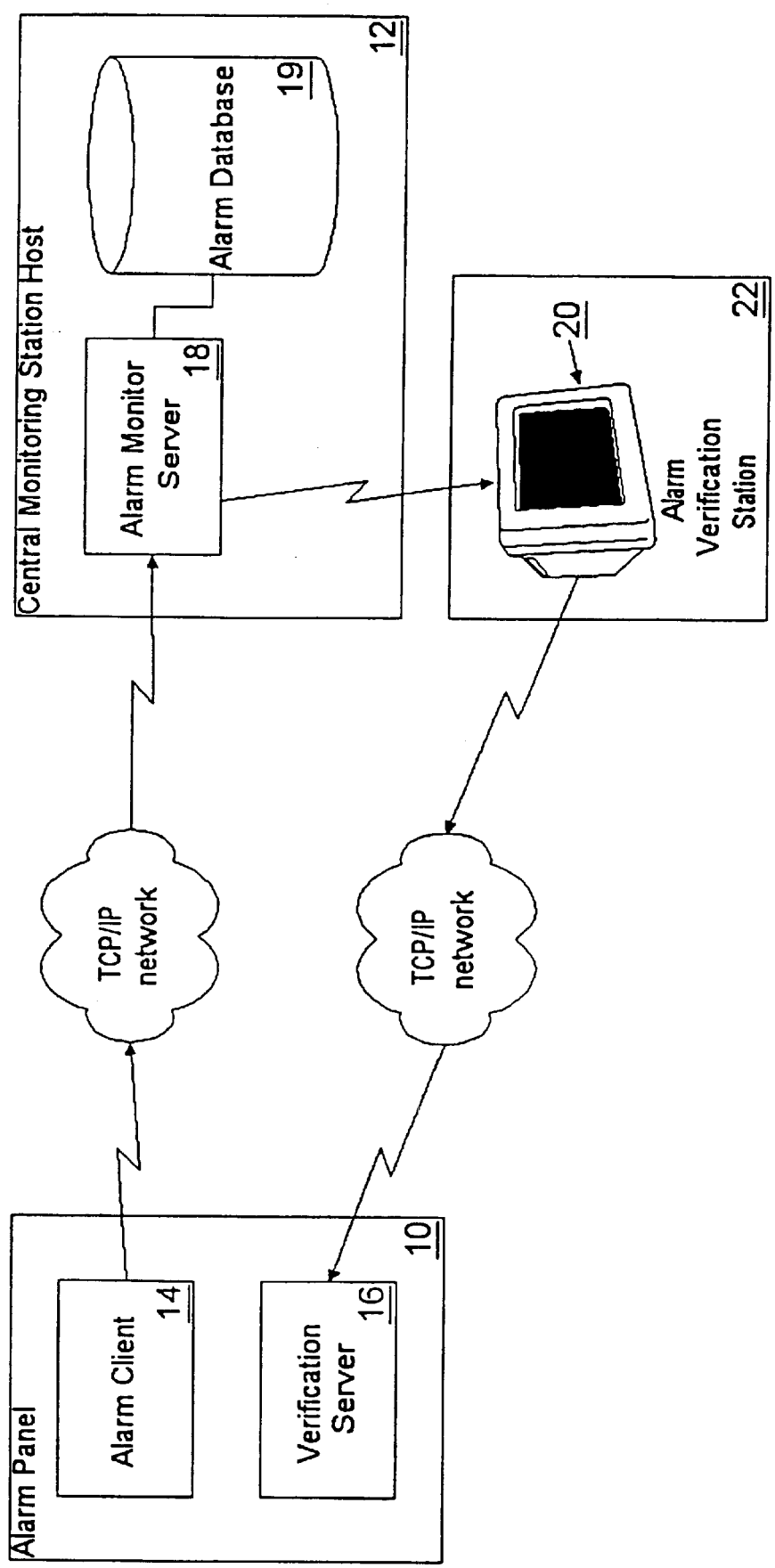
FIG. 2 is a schematic diagram showing another preferred configuration between an alarm panel host, and a central monitoring station, the verification station shown remote from the central monitoring host and having direct access to the verification server.
Figure 3:
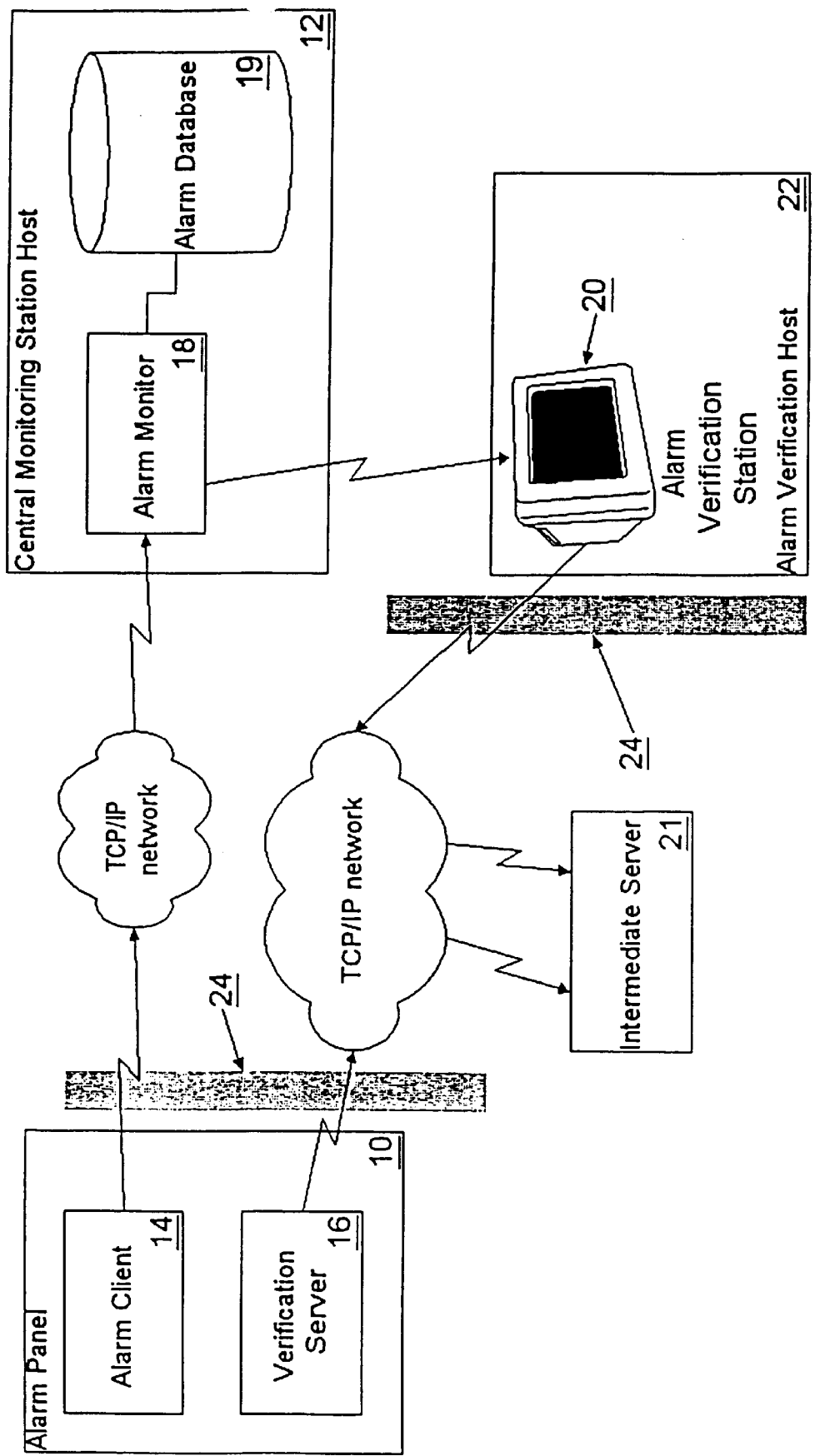
FIG. 3 is a schematic diagram showing another preferred configuration between an alarm panel host, and a central monitoring station, the verification station shown remote from the central monitoring host and using an intermediate server. Both the alarm panel host and the monitoring systems are shown protected by firewalls.

As shown in FIGS. 1,2 and 3 the system for transmitting and verifying alarm signals over a TCP/IP network, typically the Internet Network, includes software programs hosted on computer hosts. Typically computer hosts, host the software programs and supply the necessary tools to run the programs. Alarm system hosts in this embodiment are shown as the alarm panel host 10, the central monitoring station host 12 and the verification station host 22 A typical system to which the programs apply will usually include the alarm client 14, verification server 16, alarm monitor server 18, an alarm database 19 and an alarm verification station 20 and in some cases an intermediate server 21.

The term "computer" as used throughout the text of this application, does not refer solely to what is commonly understood and used by the term "computer" but is used in this context as indicating any system that sorts or assembles data in a computing or processing manner and follows programmed steps to complete a task or series of tasks.

The first embodiment as seen in FIG. 1, shows the computer hosts including the alarm panel host 10 and the central monitoring station host 12. The alarm panel host 10 hosts an alarm client 14 and a verification server 16.

The central monitoring station host 12 hosts an alarm monitor server 18, an alarm data base 19 and an alarm verification station 20.

The alarm client 14 is a program hosted by an electronic device, the alarm panel 10 that monitors alarm sensors 45 and generates an alarm signal 15 when there is an interruption in its' normal alarm sensor polling mode. If the alarm client 14 detects an abnormal condition of an alarm sensor 45, the alarm client 14 creates an alarm signal 15 which is then transmitted to the alarm monitor server 18.

The alarm monitor server 18 is a program hosted by the central monitoring station host 12 that receives the alarm signal 15 and if configured to do so, retrieves information from the alarm database 19 necessary for verification of the alarm.

The alarm database 19 may be configured to contain information in the form of the IP address of the verification server 16, or any other information necessary for the alarm verification station 20 to connect to the verification server 16 including IP addresses, host name and domain name for the alarm panel 10 and the alarm monitor server 18, TCP and User Datagram Protocol(UDP) port numbers on which the alarm panel verification server 16 is listening for clients, IP address, host name and domain name for any intermediate servers 21 which may be used by the alarm panel host 10. The alarm monitor server 18 then transmits a verification request to the alarm verification station 20.

It should be noted that each component of the central monitoring station host 12 may be co-hosted together or may be hosted remotely from each other or in combination thereof. That is to say, for example(FIG. 2), the computer hosts may also include a verification station host 22, on which the verification station 20 resides.

The second embodiment as seen in FIG. 2, shows that the verification station host 22 may be a separate work station on the same local area network as the central monitoring station host 12, or it may be an entirely separate device at a physical location remote from the central monitoring station host 12 (FIG. 2). The verification station host 22 may be a PC-compatible computer, a wireless portable device, such as a palm-top computer(not shown), which is able to connect to the TCP/IP network by wireless signals, typically the internet and receive information from the monitoring station host 12, over the Internet (possibly via email) or otherwise. The portable device may be located in the automobile of the monitor personnel, at the alarm site, outside the premises. In this embodiment, the alarm verification station 20 is an electronic or computing device or system which assists in the verification of an alarm signal 15. It may have the ability to display alarm messages and other information from the alarm monitor server 18 and alarm database 19, to display still images or video, from within the premises served by the alarm panel host 10 and may be enabled to play, record, send, or receive digital audio, or to perform remote control of lights and other electrical or robotic devices associated with the alarm panel host 10 if so configured.

The third embodiment as seen in FIG. 3, shows the alarm verification station 20 initiates a connection with the verification server 16 either directly or through an intermediate server 21, to establish the validity and the nature of the alarm. When connection is established, the alarm verification station 20 issues a verification request to the verification server 16.

The verification server 16 receives a verification request from the alarm verification station 20 and compiles a verification data response. The verification server 16 found in the alarm panel host 10 may be located locally with the alarm client 14 or it may be remote from the alarm client 14. The verification data response containing data about the nature of the alarm condition may be, for example, audio, such as bells or horns, or it may be visual ie. video or lights. The alarm verification data response is transmitted back to the alarm verification station 20 and the appropriate response is initiated, ie. contacting emergency response teams, or transmitting the appropriate protocol for resetting the alarm panel host 10 to stand-by as in the case of a false alarm. The computing device hosting the alarm verification station 20 in the preferred embodiment is able to display information received from the verification server 16 and to display still images or video. As well, the computing device hosting the alarm verification station 20 may be enabled to play, record, send, or receive digital audio signals, or to perform remote control of lights and other electrical or robotic devices associated with the alarm panel host 10 if so configured.

The use of firewalls 24 to protect host computers from hackers is well known in the art. Firewalls 24 establish a blocking system to prevent hackers from connecting with the host computer and engaging the information stored on the host. This also poses a problem for legitimate connections from outside clients such as the case with the alarm verification station 20 trying to connect with the alarm panel host 10 verification server 16 to retrieve data to verify alarm situations. To allow the alarm verification station 20 the data needed to breach the firewall 24 would also give hackers the opportunity to obtain that information as it is being transmitted or to piggy-back into the alarm client 14 during legitimate access of the alarm verification station 20 to the verification server 16.

This embodiment (FIG. 3), of the invention has developed a method of retrieving the necessary information without compromising the security of the host data system. As shown in FIG. 3, firewalls 24 are established before the alarm verification station 20 and before the alarm panel host 10 as a security measure to protect both systems from hackers. As described above the alarm client 14 detects a disruption in the alarm sensors 45 and transmits an alarm signal 15 to the alarm monitor server 18, which then receives data from the alarm database 19 and sends the combined information from the alarm signal 15 and the alarm database 19 to the alarm verification station 20. The alarm verification station 20 establishes contact with the verification server 16 to obtain alarm verification. The embodiment depicted in FIG. 3, incorporates the use of an intermediate server 21 to relay information between the alarm verification station 20 and the verification server 16. The details of this information relay will be discussed below. This configuration allows that transfer of the necessary information without causing a breach in the firewall 24 that would permit possible entry by hackers.

The intermediate server 21 is a server on a network to which hosts can connect for the exchange of information when the hosts cannot directly connect to each other. The intermediate server 21, if used, preferably resides on a host machine to which both the alarm verification station host 22 and the alarm panel host 10 can connect. The intermediate server 21 is, preferably, able to run a file transfer protocol server program. As explained, currently a server does not initiate contact to a host, the contact currently is initiated by a client. Application of the system in accordance with this invention, provides a method of transferring the information to an intermediate server 21 so that the verification information is available to the alarm verification station 20 in an alarm situation.

In the presence of an alarm situation, the alarm client 14 sends an alarm signal 15 to the alarm monitor server 18, at which point information is gathered from the alarm database 19 to allow contact of the alarm verification station 20 to the intermediate server 21. The alarm client 14 also gathers the contact information either from the alarm database 19 or it may have the necessary information on the alarm panel host 10. The alarm client 14 then transmits the contact information to the verification server 16 thus initiating the verification server 16 to establish contact with the intermediate server 21 and begin transmitting the verification response.

This FIG. 3 embodiment enables the information to be readily available on the intermediate server 21 to the alarm verification station 20. By this method, the alarm verification station 20 contacts the intermediate server 21, locates the verification data and an appropriate response can be made to the alarm situation. As described above this response may be, for example, contacting the proper authorities, resetting of the alarm or responses that it is configured for, or entering the premises.

As described the alarm verification station 20 may be a mobile unit or a palm top, and may be located in a vehicle of the monitor personnel, who may in fact be outside the premises controlled by the alarm panel host 10. This applies to both FIG. 2 and FIG. 3, wherein the alarm verification station 20 may be stationary at a location remote from the central monitoring host 12 and may be a portable monitor such as a lap top or a palm top for example.

While these embodiments are illustrated here, they are merely by way of showing examples of applications of the invention, and without limitation. The invention is not exclusively confined to such embodiments. Various different configurations are possible without departing from the scope of the invention.

Figure 4:
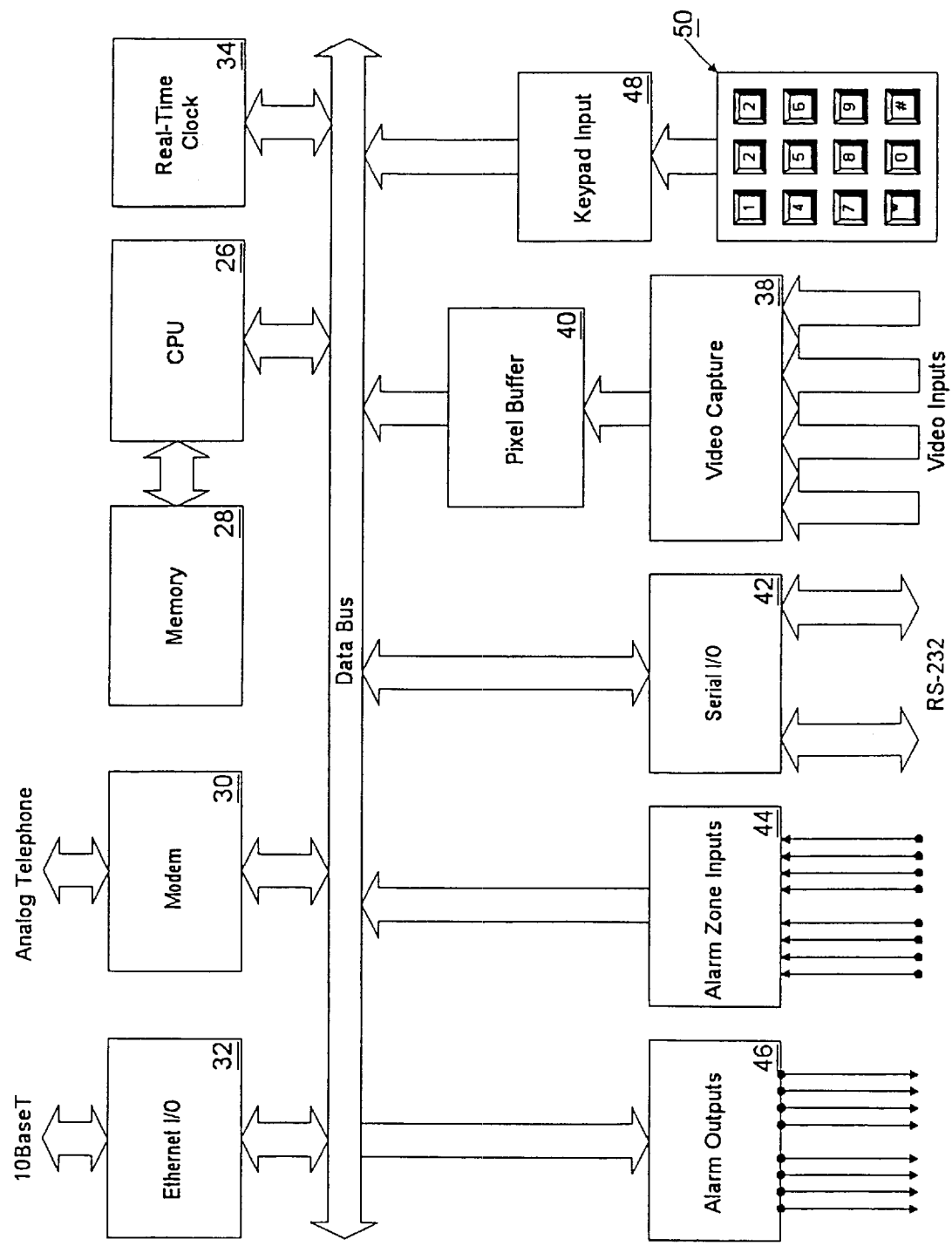
FIG. 4 is a block diagram of the alarm panel host.

FIG. 4, shows a preferred embodiment of the alarm panel host 10. This comprises an alarm panel CPU (central processing unit) 26, and an alarm panel memory 28, a modem 30, an ethernet interface 32, a real-time clock 34, video inputs 36, a video capture chip 38, a pixel buffer 40, serial in/out channels 42, alarm sensor inputs 44, alarm indicator outputs 46, a keypad 48, a keypad input interface 50 and a data bus 52.

In this embodiment alarm sensors 45 are connected to the alarm sensor inputs 44. The modem 30 is connected to an analog telephone, cellular or land-line. The alarm outputs 46 may be connected to various alarm indicating devices, such as bells, horns or flashing lights, located at the premises where the alarm sensors 45 are located. The keypad 48 and keypad input interface 50 are used to input codes for the purpose of enabling or disabling the alarm client 14 from generating alarm signals 15. Typically, the keypad 48 would be used to disarm the alarm system at the beginning of the working day and to arm it on at the end of the working day. The serial in/out channels 42 may be connected to a computer for the purpose of reconfiguring the operating parameters of the alarm client 14 and verification server 16.

Not all of these elements are required to perform the functions of an alarm panel 10, for example, the alarm panel 10 need not have a modem 28, two serial channels 42, or an ethernet interface 32, so long as it has the means of delivering information to the relevant alarm monitor server 18. An alarm panel host 10 may have additional in/out facilities such as audio input or output, wireless Local Area Network (LAN) or cellular data modems.

FIGS. 5,6,7,8,9 and 10 are schematic flowcharts of the steps taken by the alarm system in the event of and alarm situation. The following is a written step-by-step explanation of each flowchart.

Figure 5:
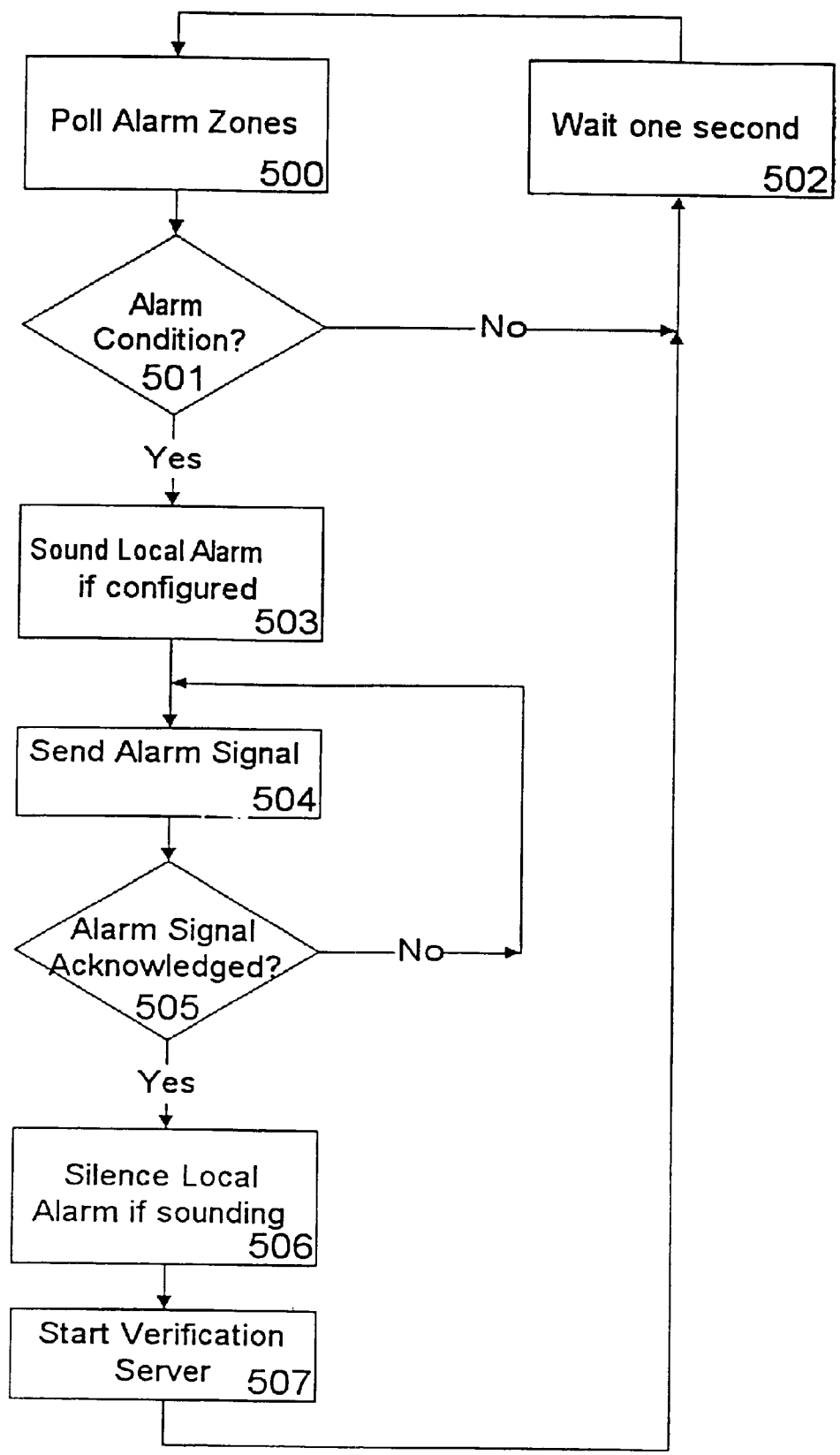
FIG. 5 is a step by step flowchart of the preferred method of the operation of the alarm system from the perspective of the alarm client.

Referring to FIG. 5, this depicts the sequence of steps followed by the alarm panel 10 during normal monitoring of an alarm system and in the event of detecting an alarm situation.

Each significant step or operation is referenced by the three digit reference 500, 501 and so on, in FIG. 5.

500. The alarm sensors 45 are monitored or polled, by the alarm client 14, for alarm conditions.
501. The alarm client 14 determines if there is an alarm condition.
502. If there is no alarm condition detected the alarm client 14 polls at timed intervals, in the case shown, 1 second intervals.
503. In the event that the polling of the alarm sensors 45 indicates an alarm condition, the alarm client 14 may, if so configured, cause a local alarm to sound.
504. The alarm client 14 sends the alarm signal 15 message to the alarm monitor server 18. The alarm client 14 composes an alarm signal 15 message and sends it to the alarm monitor server 18, this process is explained in more detail by FIG. 6.
505. The alarm client 14 does not receive an acknowledgement message from the alarm monitor server 18 within a specified time, the alarm client 14 will send the alarm signal 15 message again as described in FIG. 6.
506. The alarm client 14 may silence local alarms if configured to do so.
507. The alarm client l4 may send a message to initiate the verification server 16, if configured to do so.

Figure 6:
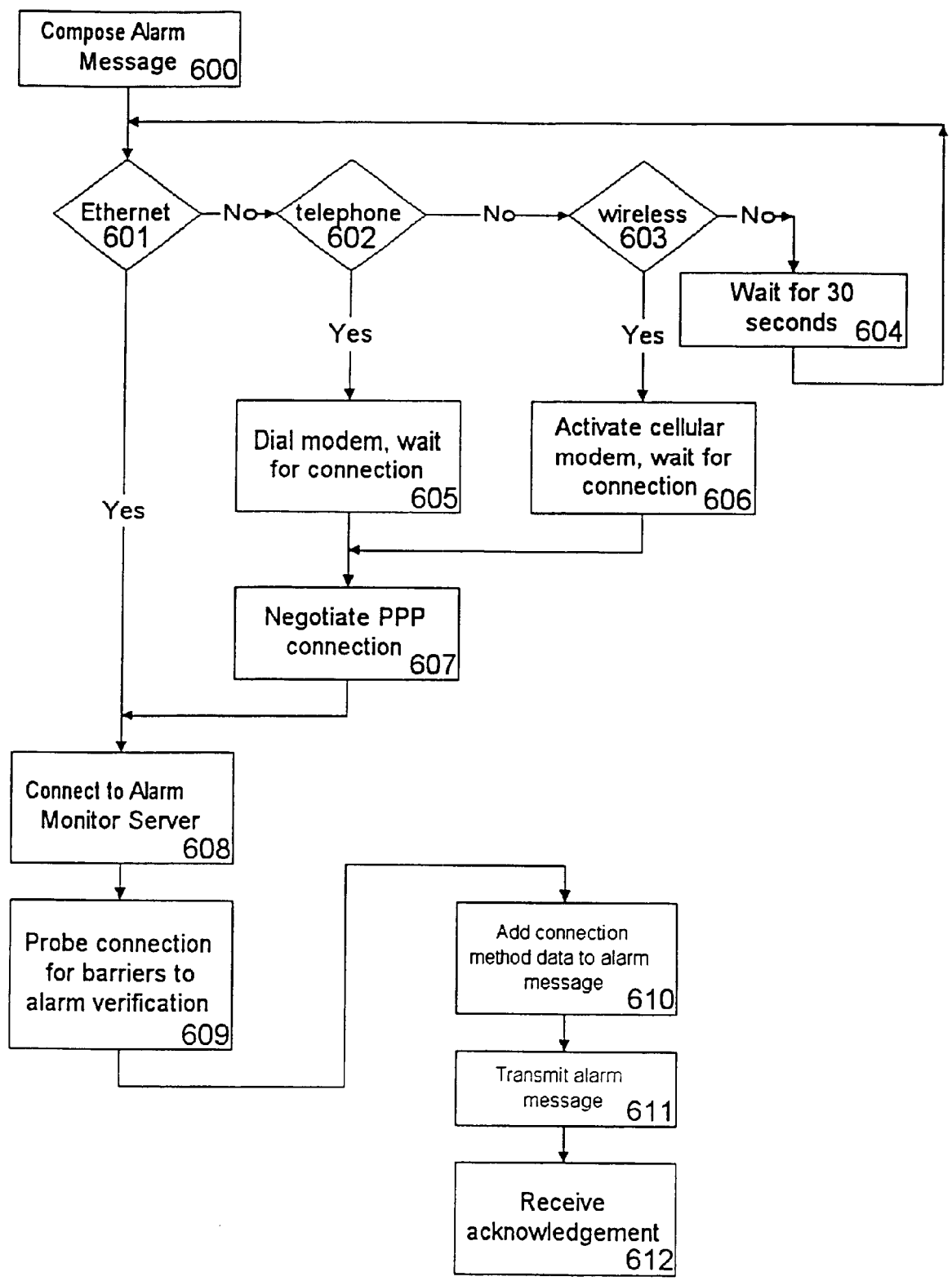
FIG. 6 is a step by step flowchart of the preferred method of the sending of the alarm signal, upon detection of an alarm situation, from the perspective of the alarm client.

FIG. 6 shows the sequence of steps showing the alarm panel composing the alarm signal 15 message and initiating connection with the alarm monitor server 18, and retrieving connection information necessary for contacting the verification server 16.

Each significant step or operation is referenced by the three digit reference 600, 601 and so on, in FIG. 6.

600. The alarm client 14 hosted by the alarm panel 10 composes an alarm message, The alarm signal 15 message may include information about the nature of the alarm situation, the current IP address of the alarm client 14 and any other information required for the alarm verification station 18 to connect to the alarm client 14 over the TCP/IP network.
601. The alarm panel 10 connects to the internet. The connection is made by any data communication system that has the capability of relaying information from one computing device to another. Presently, examples of data communication systems may be an analog telephone and modem, a wireless telephone and modem, or cable wire delivery. These are examples of the some presently existing systems, the invention is not limited solely to the mentioned forms of transfer, but may be adapted to any possible future data communication systems which may include satellites, or fibre optics communication, or some presently yet to be invented system. Alarm client 14 initiates a connection over the TCP/IP network to the alarm monitor server 18. This step may include dialling a telephone number, negotiating a point-to-point protocol (PPP) connection, pinging one or more IP addresses, acquiring a dynamic IP address from an internet service provider or a local dynamic host configuration protocol (DHCP) server, resolving server names to IP addresses through the use of the domain name service (DNS), and/or registering the alarm client 14 dynamic IP address with one or more DNS servers or other servers provided to facilitate connection between the alarm client 14 and the alarm monitor server 18.
602. The alarm client l4 seeks a method of connection to the alarm monitor server 18 via an analogue telephone.
603. In the case that an analogue connection is not made, the alarm client 14 will seek another method of connection. In this embodiment, a wireless connection for example a cellular phone.
604. If a connection is not made, the alarm client 14 will wait for a specified time period, in this embodiment, 30 seconds. After the time interval has elapsed, the alarm client 14 will retry to connect to the alarm monitor server 18 until a successful connection has been made.
605. If the alarm client 14 detects an analogue telephone it will then dial the modem and waits for an connection.
606. When the alarm client 14 detects a wireless information transfer system, the alarm client 14 will activate a cellular modem and wait for connection.
607. Once a connection has been made between the alarm client 14 and an analogue or wireless information transfer system, the alarm client 14 will negotiate a point-to-point protocol to connect to the alarm monitor server 18.
608. The alarm client 14 establishes a connection to the alarm monitor server 18.
609. Once a link has been made between the alarm client 14 and the alarm monitor server 18, the alarm monitor server 18 probes the alarm database 19 for further information necessary for linking to alarm verification station 20 to the verification server 16 or to an intermediate server 21, if used. The alarm client 14 adds to the alarm signal 15 message its current IP address and any other information required to allow an verification server 16 to connect to the alarm client 14 over the TCP/IP network. This information may have been previously configured, previously acquired by the alarm client 14 or alarm monitor server 18, or acquired during the initiation of the connection between the alarm client 14 and the alarm monitor server 18. If the topology of the TCP/IP network between the alarm client 14 and the alarm verification station 20 is known to be or has been discovered by the alarm client 14 to be incompatible with a direct connection from the alarm verification station 20 to the alarm client 14, then the alarm client 14 will include in the alarm signal 15 the IP address, host name, or other connection information for an intermediate server 21) which is accessible to the alarm client 14, the alarm verification station 20 and the alarm monitor server 18.

610. The alarm client 14 then links the information gathered from the alarm database 19 to the alarm signal 15.
611. The alarm client 14 transmits the alarm signal 15 with the linked information to the alarm monitor server 18. The alarm monitor server 18 uses the connection information to connect to the alarm verification station 20 and transmits an alarm verification request. The verification request contains the necessary information for connection to the verification server 16 and for retrieval of the required information to verify the nature of the alarm.
612. The alarm monitor server 18 transmits a message back to the alarm client 14 confirming receipt of the alarm signal 15. The alarm client 14 may then for example silence alarms, control lights, begin the verification server 16 or any other steps that it has been configured for.

Figure 7:
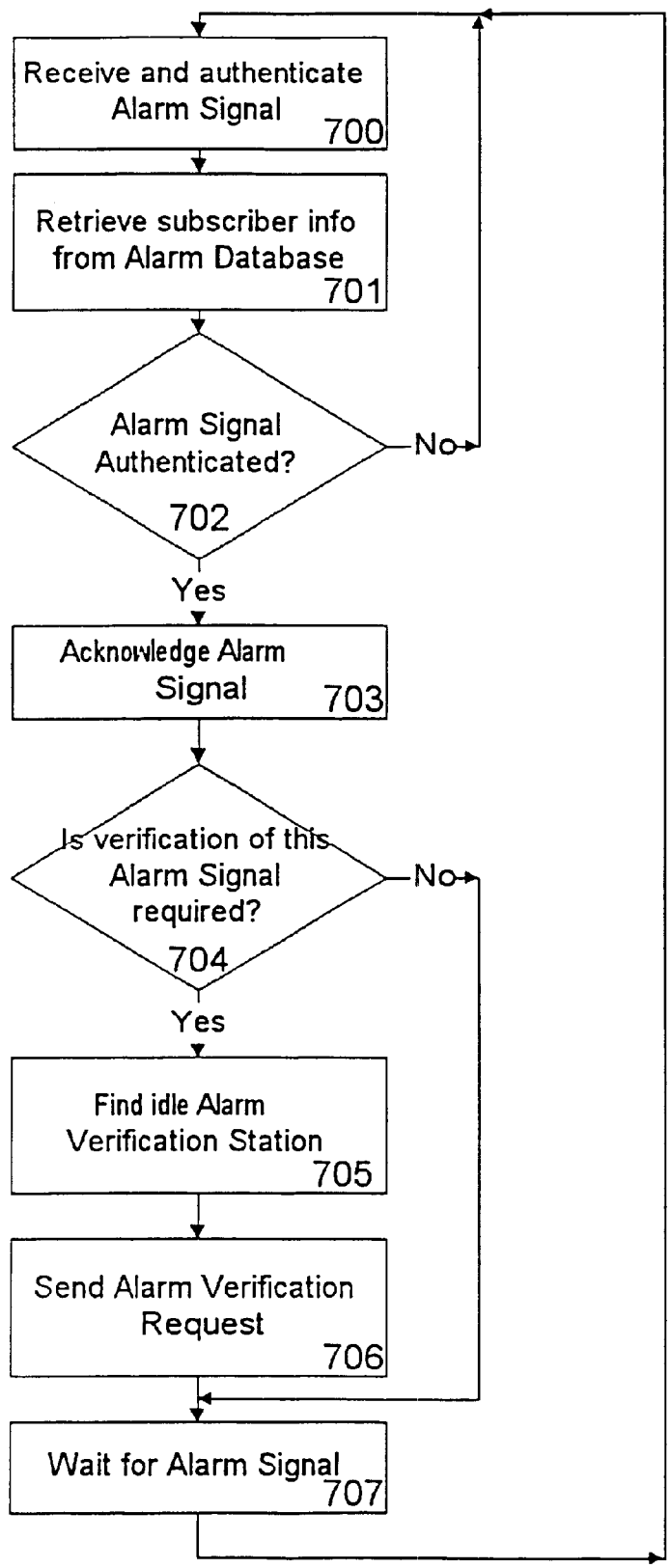
FIG. 7 is a step by step flowchart of the preferred method of the operation of the alarm system, upon detection of an alarm situation, from the perspective of the alarm monitor.

FIG. 7, illustrates a description of the steps followed by the alarm monitor server 18 after receipt of an alarm message or signal 15 from the alarm client 14.

Each significant step or operation is referenced by the three digit reference 700, 701 and so on, in FIG. 7.

700. The alarm monitor server 18 receives the alarm signal 15 from the alarm client (14). The alarm monitor server 18 then returns a confirmation of receipt and an authentication message to the alarm client 14 to confirm the alarm message. This may be done immediately or the alarm monitor server 18 may first retrieve information from the alarm database 19, add it to the alarm authentication message and then transmit it back to the alarm client 14, if configured to do so.
701. The alarm monitor server 18 retrieves alarm client 14/subscriber information from the alarm database. This information may include the current IP address, host name, any IP addresses necessary for an intermediate server 21, domain names and information relating to the nature of the alarm.
702. The alarm monitor server 18 repeatedly sends the authentication request to the alarm client 14 until the alarm signal 15 is confirmed.
703. The alarm monitor server 18) acknowledges receipt of the alarm signal 15.
704. The alarm monitor server 18 determines if verification of the alarm signal 15 is required. If verification is not required the alarm monitor server 18 returns to stand-by mode to await new alarm signals 15. When verification is required by the subscriber, the alarm monitor server 18 proceeds to the next step.
705. The alarm monitor server 18 searches for an idle alarm verification station 20.
706. The alarm monitor server 18 sends the verification request to the alarm verification station 20 commanding the alarm verification station 20 to connect to the verification server 16, and relay the verification request and collect verification data. The alarm monitor server 18 then awaits a confirmation response from the alarm verification station.
707. The alarm monitor server 18 then returns to stand-by mode to await a new alarm signal 15.

Figure 8:
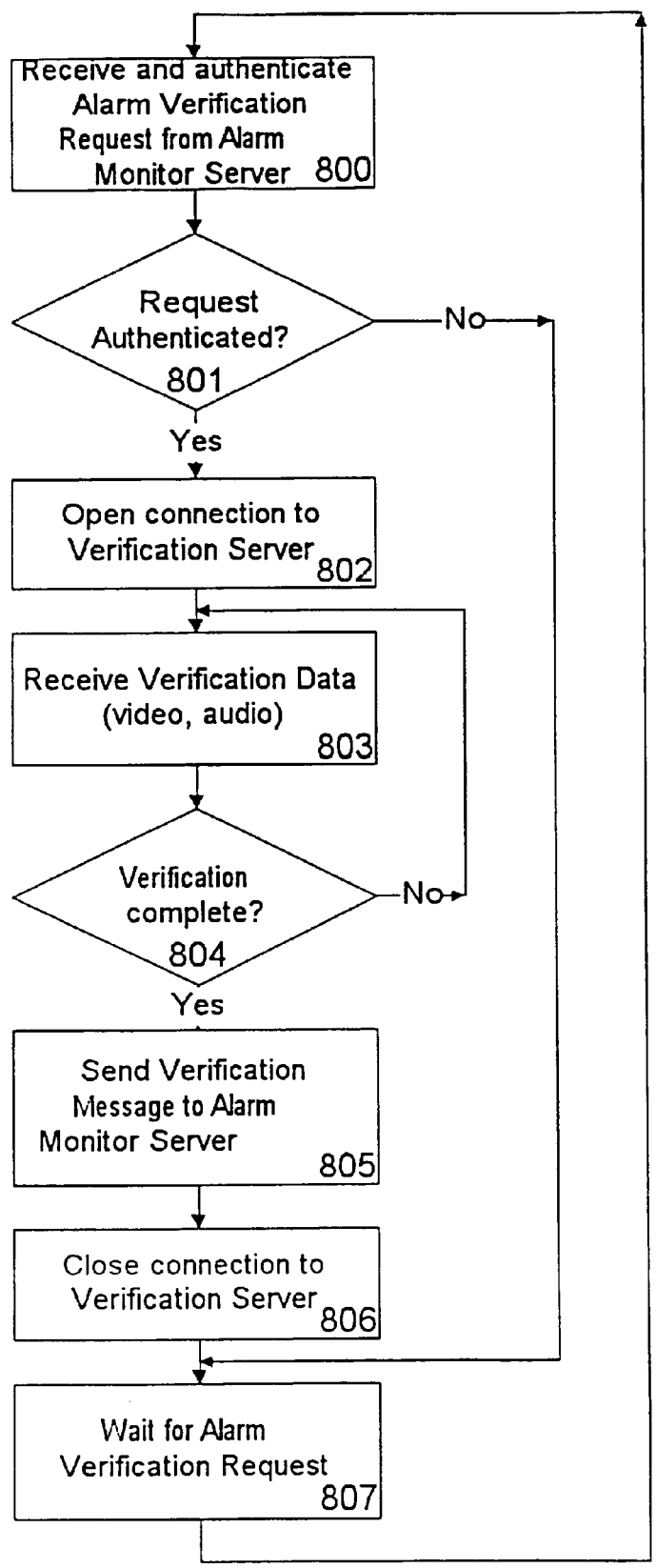
FIG. 8 is a step by step flowchart of the preferred method of the operation of the alarm system, upon detection of an alarm situation, from the perspective of the alarm verification station.

FIG. 8 illustrates the steps followed by the alarm verification station 20 upon receipt of a verification request.

Each significant step or operation is referenced by the three digit reference 800, 801 and so on, in FIG. 8.

800. The alarm verification station 20 receives a verification request from the alarm monitor server 18.
801. The alarm verification station 20 determines if the verification request from the alarm monitor server 18 has been authenticated. An un-authenticated request causes the alarm verification station 20 to remain in stand-by mode 807 until an authenticated verification request is received.
802. Upon receipt of an authenticated verification request the alarm verification station 20 uses the data supplied in the verification request to establish a connection to the verification server 16. This connection may be opened directly or may involve an intermediate server 21 if necessary.
803. The alarm verification station 20 receives verification data from the verification server 16. The verification data may be, for example, in the form of video or audio signal, but is not limited to these examples.
804. The alarm verification station determines if the verification data is complete, if the information is incomplete, the system will loop back to step 803. Upon receipt of the verification data, the alarm verification station 20 determines an appropriate response to the alarm situation. As explained earlier, appropriate responses may include, but are not limited to, contacting appropriate authorities, resetting of the alarm or responses that it is configured for.
805. The alarm verification station 20 sends a message back to the alarm monitor server 18 of a positive or negative confirmation response to the alarm situation. This process is described in more detail in FIG. 9.
806. The alarm verification station 20 terminates the connection to the verification server 16 or the intermediated server 21, in cases where an intermediate server 21 has been employed.
807. The alarm verification station 20 then returns to stand-by mode to await further alarm verification requests.

FIG. 9, illustrates the operation of the verification server 16 when sending an alarm verification message to the alarm monitor server 18.

Each significant step or operation is referenced by the three digit reference 900, 901 and so on, in FIG. 9.

900. The alarm verification station 18 determines the status of the alarm situation.
901. The alarm verification station 18 determines if the alarm signal 15 is authentic.
902. A negative confirmation response is composed by the alarm verification station 20 if the alarm is not authenticated.
903. A positive confirmation response is composed by the alarm verification station 20 if the alarm is authenticated.
904. A connection is established and authenticated with the alarm monitor server 18 using the TCP/IP network either directly or through the use of an intermediate server 21.
905. The confirmation message is transmitted via the TCP/IP network either directly to the alarm monitor server 18 or through an intermediate server 21. This message is received in step 706 of FIG. 7.
906. The alarm verification station 20 awaits verification that the confirmation message has been received by the alarm monitor server 18. If the alarm verification station 20 does not get verification of receipt, it will resend the message.

907. When verification of receipt of the confirmation message is received by the alarm verification station 20, the connection to the alarm monitor server 18 or the intermediate server 21 is terminated.

FIG. 10 illustrates a description of the method of operation of the verification server 16 upon receipt of a verification request.

1000. The verification server 16 accepts a connection from the alarm verification station 20 either directly or through an intermediate server 21.

1001. The verification server 16 then authenticates the alarm verification station 20 through a series of security checks. If the alarm verification station 20 is not authenticated then the verification server 16 closes the connection.

1002. Upon authentication of the alarm verification station 20 the verification server 16 determines if the alarm verification station 20 is ready to receive verification data. This verification data could be for example a video from the scene of the alarm.

1003. The verification server 16 transmits the verification data if it is determined that the alarm verification station 20 is ready to receive.

1004. If the alarm verification station 20 is determined not to be ready to receive, then the verification server 16 checks if the alarm verification station 20 is ready to transmit information to the verification server 16.

1005. The verification server 16 receives the information from the alarm verification station 20 if it was determined ready to transmit information to the verification server 16. This information may be a request for a different view from a different video camera, for example.

1006. If the alarm verification station 20 is determined not to be ready to send or receive, then the verification server 16 checks if the alarm verification station 20 is still connected to the verification server 16 or the intermediate server 21 if used. If the connection is confirmed, the verification server 16 will run through the process of steps 1002 to 1006 again until there is a successful transmission or until it is determined that the connection has been terminated.

1007. When the connection is determined to have been terminated, the verification server 16 closes the connection and awaits new connections.

The foregoing is a description of a preferred embodiment of the invention which is given here by way of example. The invention is not to be taken as limited to any of the specific features as described, but comprehends all such variations thereof as come within the scope of the appended claims.

What is claimed is:

1. A method for transmitting an alarm signal from an alarm client to an alarm monitor server and verifying said alarm signal and transmitting said alarm signal to an alarm verification station and then transmitting said alarm signal to an alarm verification server over a TCP/IP network comprising the steps of:

sending said alarm signal containing alarm information and information about how to obtain alarm verification information from said alarm client to said alarm monitor server over said TCP/IP network;

sending an alarm verification request signal from said alarm monitor server to said alarm verification station, said request signal containing alarm information and information about how to obtain alarm verification information over said TCP/IP network;

connecting said alarm verification station to said alarm verification server, and sending said alarm verification request signal to said alarm verification server;

retrieving said alarm verification information at said alarm verification server and generating an alarm verification signal; and receiving said alarm verification signal over said TCP/IP network at said alarm verification station.

2. The method of claim 1, further comprising the step of receiving information about how to obtain said alarm verification information over said TCP/IP network, from a computer readable memory.

3. The method of claim 1, further comprising the step of sending an instruction from said alarm client to initiate said alarm verification server to begin formulating said alarm verification signal.

4. The method of claim 3, wherein, after said alarm verification server is initiated, said alarm verification server waits to be contacted by said alarm verification station.

5. The method of claim 4, wherein said alarm verification station contacts said alarm verification server and obtains said alarm verification information from said alarm verification server, whereby said alarm verification information is obtained by said alarm verification station.

6. The method of claim 5, including the step of providing an intermediate server, and wherein, after said alarm verification server is initiated, said alarm verification server sends said alarm verification information to said intermediate server.

7. The method of claim 6, wherein said alarm verification information is obtained by said alarm verification station by said alarm verification station contacting said intermediate server and contacting said alarm verification information from said intermediate server.

8. A system for transmitting and verifying alarm signals over a TCP/IP network comprising:

an electronic alarm monitoring system referred to as an alarm panel, including connections for connecting to a TCP/IP network, receivers for receiving alarm indications from at least one alarm sensor, and means for receiving alarm verification information from at least one alarm verification information source;

an alarm client;

a verification server connected to said alarm panel;

an alarm monitor server;

communication circuits for said alarm client to communicate with said alarm monitor server;

an alarm verification station adapted to connect to said TCP/IP network; and communication circuits for said alarm monitor server to communicate with said alarm verification station;

wherein when said at least one alarm sensor generates an alarm signal at said alarm client relating to an alarm indication, said alarm client prepares said alarm signal containing information about the alarm indication, and information about how to obtain said verification information from said verification server over said TCP/IP network, and sends said alarm signal to said alarm monitor server, and said information about said alarm indication and said information about how to obtain said alarm verification information from said verification server over said TCP/IP network, is forwarded to said verification station so as to adapt said verification station to obtain said alarm verification information.

9. The system of claim 8, wherein the means for said alarm panel to communicate with said alarm monitor server comprises said TCP/IP network.

10. The system of claim 9, wherein the means for said alarm monitor server to communicate with said alarm verification station comprises said TCP/IP network.

11. The system of claim 10, wherein said alarm monitor server and said alarm verification station are resident on the same host computer.

12. The system of claim 10, wherein said alarm monitor server and said alarm verification station are resident on another host computer.

13. A method for transmitting an alarm signal from an alarm client to an alarm monitor server and verifying said alarm signal over a TCP/IP network comprising the steps of:

sending said alarm signal from said alarm client to said alarm monitor server over said TCP/IP network;

sending an alarm verification signal from said alarm monitor to an alarm verification server over said TCP/IP network; and receiving said alarm verification signal over said TCP/IP network at said alarm verification server.

14. A system for transmitting and verifying alarm signals over a TCP/IP network comprising:

an electronic alarm monitoring system for connecting to a TCP/IP network;

receivers for receiving alarm indications from at least one alarm sensor;

an alarm client;

a verification server connected to said alarm monitoring system;

an alarm monitor server, said alarm client being adapted to communicate with said alarm monitor server; and an alarm verification station adapted to connect to said TCP/IP network, and communicating with said alarm monitor server;

wherein when said at least one alarm sensor generates an alarm signal at said alarm client, said alarm verification information is communicated from said verification server over said TCP/IP network, so as to send said alarm signal to said alarm monitor server.

* * * * *